Aug. 8, 1933.   P. R. DRENNING   1,921,913
TRUCK BOLSTER AND SIDE BEARING STRUCTURE WITH LATERAL MOTION MEANS
Filed March 22, 1927   6 Sheets-Sheet 1
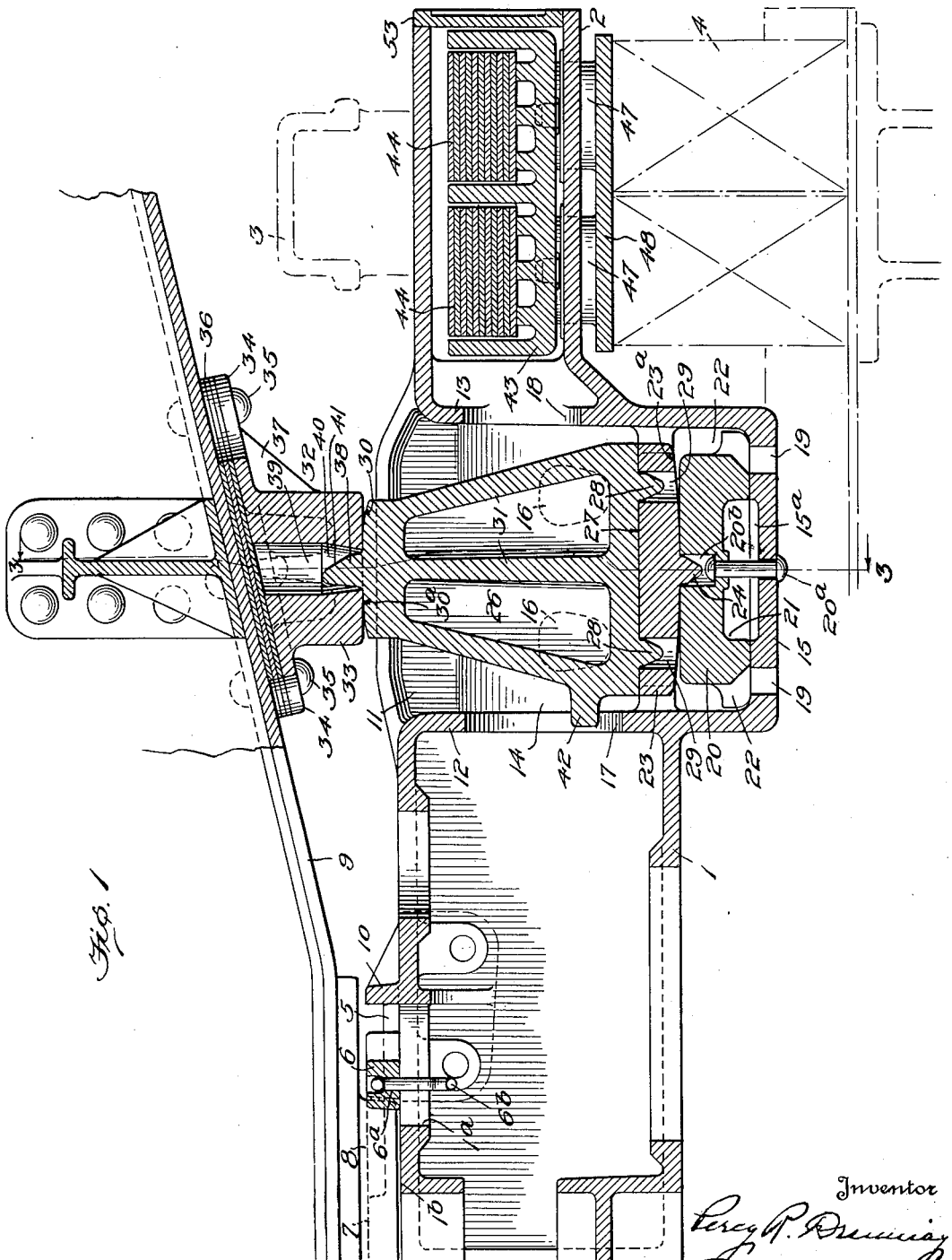

Aug. 8, 1933.  P. R. DRENNING  1,921,913
TRUCK BOLSTER AND SIDE BEARING STRUCTURE WITH LATERAL MOTION MEANS
Filed March 22, 1927     6 Sheets-Sheet 2
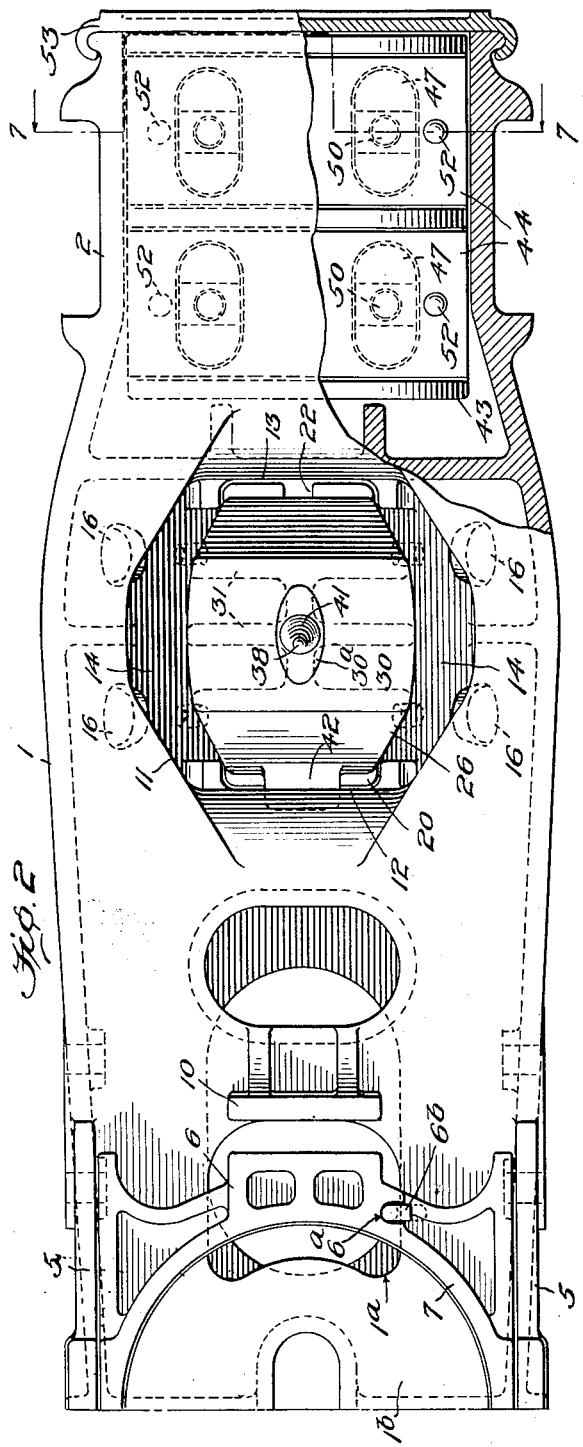

Aug. 8, 1933.  P. R. DRENNING  1,921,913
TRUCK BOLSTER AND SIDE BEARING STRUCTURE WITH LATERAL MOTION MEANS
Filed March 22, 1927   6 Sheets-Sheet 3
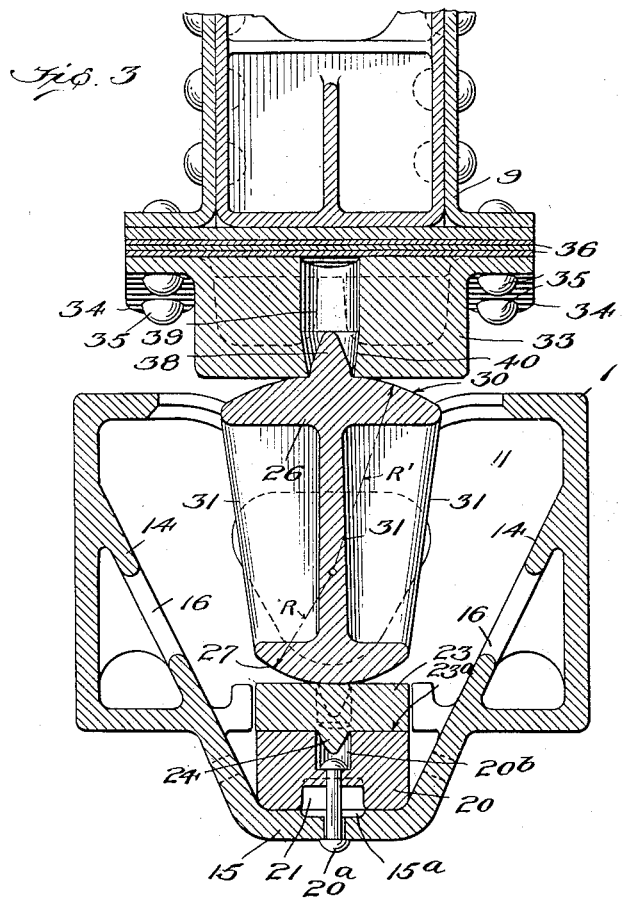
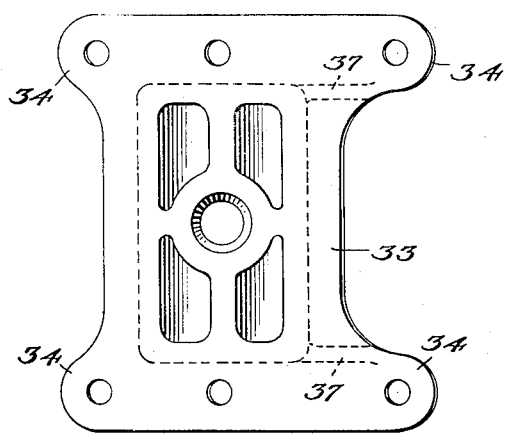
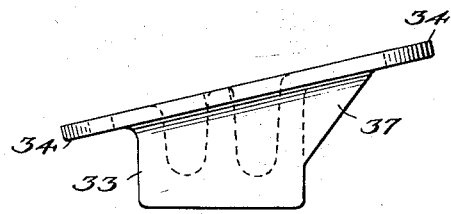

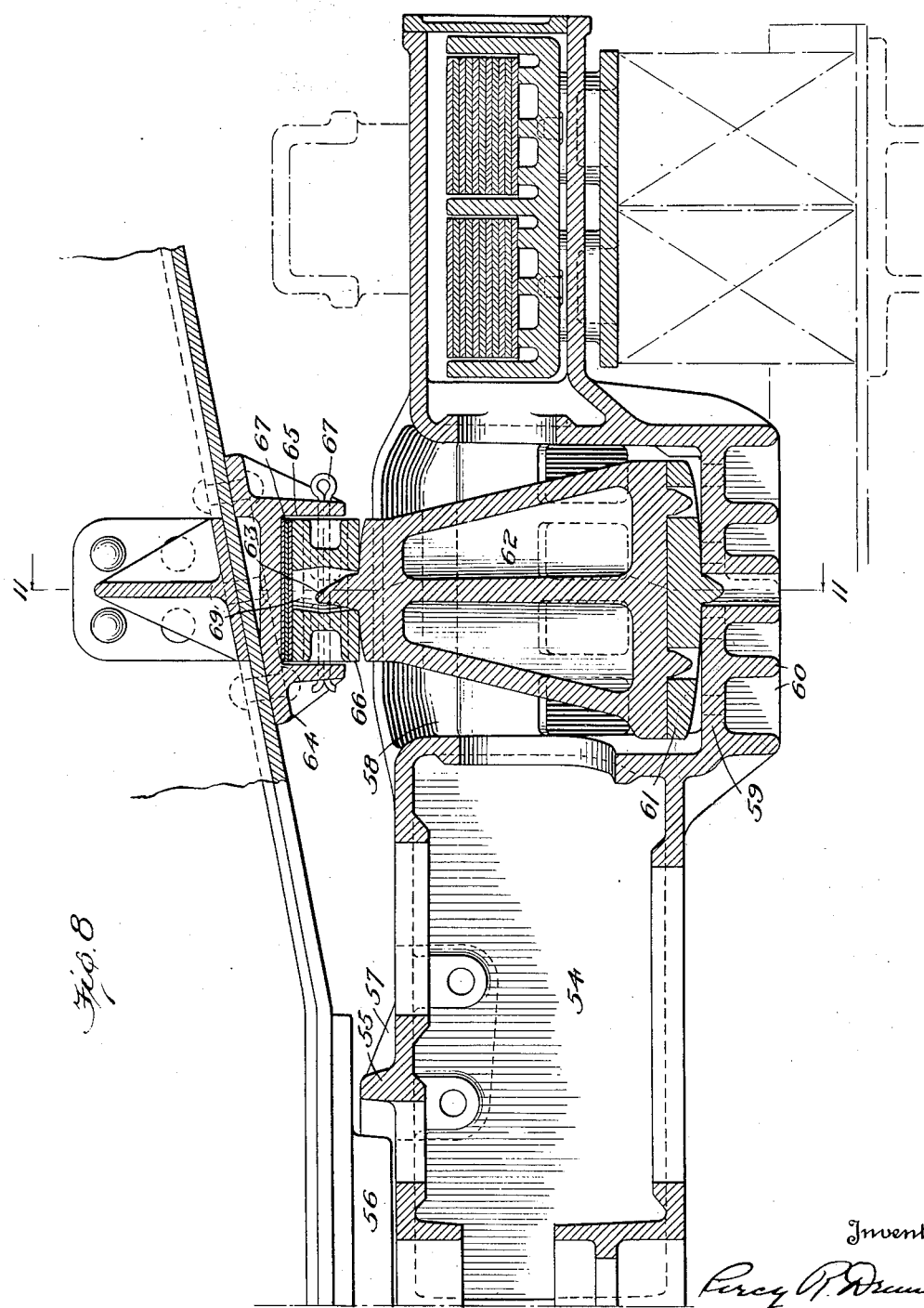

Aug. 8, 1933.    P. R. DRENNING    1,921,913
TRUCK BOLSTER AND SIDE BEARING STRUCTURE WITH LATERAL MOTION MEANS
Filed March 22, 1927    6 Sheets-Sheet 5
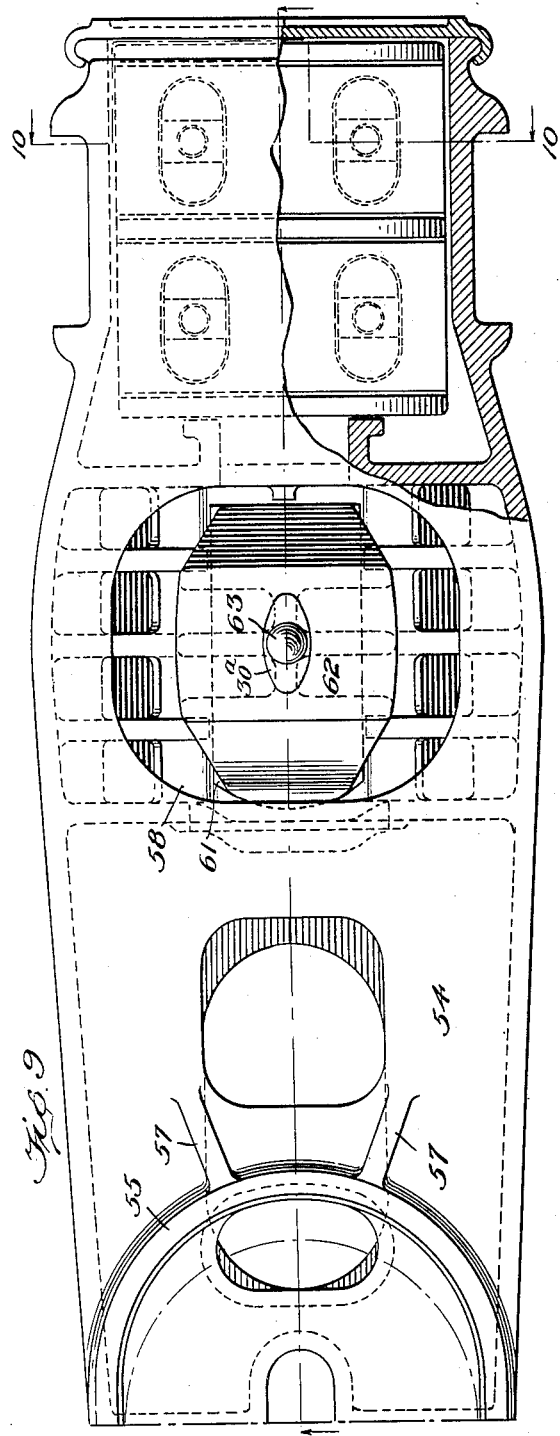
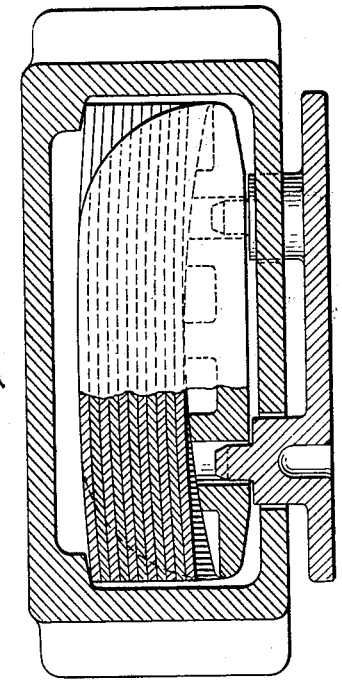

Aug. 8, 1933.   P. R. DRENNING   1,921,913
TRUCK BOLSTER AND SIDE BEARING STRUCTURE WITH LATERAL MOTION MEANS
Filed March 22, 1927   6 Sheets-Sheet 6
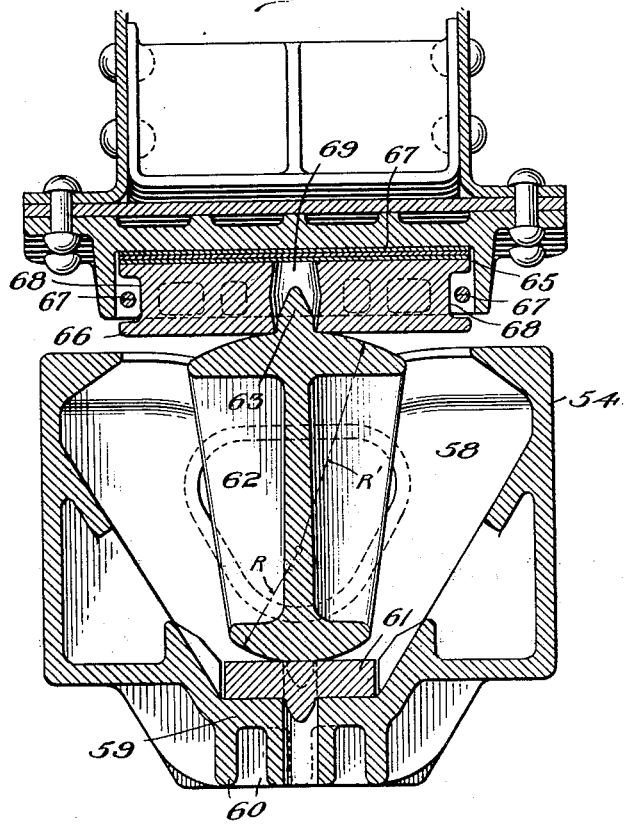
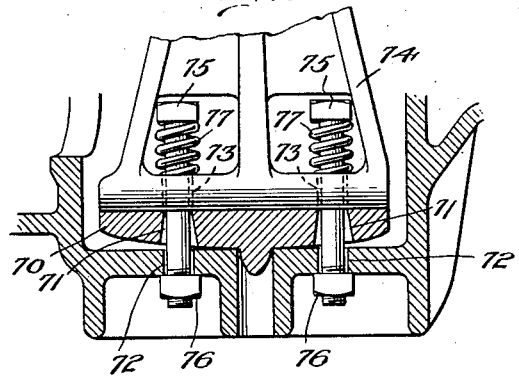

Patented Aug. 8, 1933

1,921,913

UNITED STATES PATENT OFFICE 1,921,913

TRUCK BOLSTER AND SIDE BEARING STRUCTURE WITH LATERAL MOTION MEANS

Percy R. Drenning, Baltimore, Md., assignor to T. H. Symington & Son, Inc., Baltimore, Md., a Corporation of Maryland Application March 22, 1927. Serial No. 177,340

35 Claims. (Cl. 308—224)

The invention relates to railway car truck bolsters.

The principal object of the invention, generally stated, is to provide a truck bolster equipped with frictionless side bearings for taking the load instead of the weight being sustained upon center bearings as is usually the case, a stable, four point suspension being thus provided, the usual center plate acting simply as pivot means permitting relative frictionless swivelling movement of the truck and body bolsters as must occur in car travel.

An important object of the invention is to provide a truck bolster equipped with side bearing rockers having curved surfaces coacting with their supporting means and with depending bearing elements carried by the body bolster and peculiarly arranged to permit not only relative swivelling movement of the truck and body bolsters but also lateral motion of the latter with respect to the side frames as is a known desirable feature.

Another object of the invention is to provide side bearings having surfaces of such relative curvature as to exert a lifting action upon the body bolster during lateral motion thereof, this feature acting to insure centering of the parts under normal conditions and the return thereof to normal after movement, there being no lifting action during mere swivelling but flat spots being provided on certain of the curved surfaces to give stability and to effect squaring and centering of the trucks.

A further object is to provide a side bearing structure embodying elements carried respectively by the truck and body bolsters and intervening means constituting the connection therebetween, the side bearings being moreover of such arrangement and mounting as to permit torsional movement thereof about a substantially vertical axis when relative swivelling movement of the truck and body bolsters occurs, this movement being independent of or simultaneous with lateral motion of the body bolster with respect to the side frames.

Another object is to provide a truck bolster with a novel pocket structure receiving and accommodating the side bearings, the pocket formation being such as to insure rigidity, the pockets and side bearings being furthermore so related as to prevent ironing out of any of the parts under abnormally heavy load conditions or as the result of prolonged service under normal load conditions.

A more specific object of the invention is to provide a side bearing structure in which the side bearing rockers will always move in such manner that the axis or directrix of the curved lower surface will remain parallel with the axis of the truck bolster, the rocker consequently moving in a plane or direction at right angles to the bolster axis, the torsional movement which occurs when there is relative swivelling movement of the truck and body bolsters taking place only at the top of the side bearing rocker and being reduced, theoretically, to a point, the invention further contemplating the novel formation at the top of each rocker for connection with the coacting depending bearing elements carried by the body bolster, all necessary movement being permitted without any danger of binding of the parts.

Another object of the invention is to provide side bearing rockers so constructed and arranged that incorrect assembly will be impossible, it being practically essential that the rockers be installed in a certain position to insure proper action thereof.

Another object is to provide a truck bolster embodying the above mentioned characteristics and preferably also provided internally with spring means acting in series with the truck springs for the purpose of materially increasing the spring travel and capacity, the auxiliary spring means having absorption and a different period of oscillation from that of the truck springs so as to break up synchronization and prevent any development of car roll or side sway as well as to eliminate "jiggle".

A collateral object is to provide a truck bolster with improved stop means coacting with the center plate depending from the body bolster for limiting the extent of lateral motion of the body bolster with respect to the side frames.

Another detailed object is to provide a truck bolster constructed to incorporate the above advantageous features but yet capable of being used to replace a standard bolster of any of the conventional patterns wihout involving any changes or modifications in the construction of the side frames or other truck parts.

To the attainment of the foregoing and other objects and advantages, such as comparative simplicity, reduction of wheel flange wear and pressure, elimination of forces producing racking in car bodies, ease in assembly, efficiency in action, durability, and a general improvement of the art, the invention preferably consists in the details of construction and the arrangement and combination of parts to be hereinafter more fully described and claimed, and illustrated in the accompanying drawings in which:

Figure 1 is a vertical longitudinal section through a truck bolster and portion of a body bolster, showing the preferred embodiment of the invention, Figure 2 is a top plan view of the truck bolster, Figure 3 is a vertical cross sectional view taken on substantially the line 3—3 of Figure 1, Figure 4 is a detail view of the bearing element depending from the body bolster, Figure 5 is a side elevation thereof, Figure 6 is a plan view of the strain distributing member located within the bottom of the pocket, Figure 7 is a cross sectional view taken on the line 7—7 of Figure 2, Figure 8 is a view similar to Figure 1 showing a slight modification, Figure 9 is a plan view thereof, Figure 10 is a cross section taken on the line 10—10 of Figure 9, Figure 11 is a vertical cross sectional view taken on the line 11—11 of Figure 8, and Figure 12 is a fragmentary view illustrating a slight modification.

Referring more particularly to the drawings, the numeral 1 designates, generally, the bolster which is of hollow formation and suitably webbed interiorly so as to possess the necessary strength and rigidity. At its ends are reduced extensions 2 adapted to fit within the window openings in the side frames 3 and to rest upon the usual supporting springs 4. As it is intended that the load be sustained upon side bearings, to be described, the usual center bearing structure is replaced by a combination of elements permitting the body bolster to have lateral motion with respect to the side frames.

At its central portion the top of the bolster is represented as having upstanding guide flanges 5 between which is located a slidably mounted guide member or chafing casting 6 including a circular upstanding flange 7 receiving the usual center plate 8 which depends from the body bolster 9. The guide 6 must of course move longitudinally upon the truck bolster when lateral motion occurs and its movement is limited as by means of stops 10 located preferably near the center line or axis of the truck bolster beyond the opposite ends of the member 6. The member 6 may be strengthened by thickened portions at the areas of engagement. There is intended to be a certain amount of clearance between the bottom surface of the center plate 8 and the top surface 1ᵇ of the central bolster portion within the confines of the movement of center plate 8 so that no weight will come upon the center of the truck bolster or upon the body center plate.

The flanges 5 in addition to being perpendicular to the top surface of the truck bolster are parallel and operate as stops to prevent transverse movement of the chafing casting or guide member 6 with respect to the bolster. As mentioned above, longitudinal movement is permitted but is limited by the stops 10. To permit handling of the assembled bolster prior to its mounting within a truck without there being danger of disassociation of the chafing casting or guide, the latter is preferably provided at some point with a hole 6ᵃ alining with one edge of the opening 1ᵃ in the top of the bolster and receiving a pin 6ᵇ which has both ends upset as shown. After this pin is in place it is evident that the chafing casting or guide member cannot be removed without a positive effort, accidental displacement being avoided. By providing this particular construction of chafing casting or guide it is evident that the structure is far superior to the ordinary arrangement in view of the fact that this casting or guide receives the center plate snugly and moves with the body bolster when lateral motion occurs. In the ordinary arrangement wherein there is provided simply an elliptical or substantially elliptical guide flange, the strain is concentrated at the point of tangency of the center plate with the flange at the limit of movement of the body bolster when lateral motion thereof occurs. The present structure is consequently much more durable and better capable of withstanding the wear for a prolonged period.

Near each end the truck bolster 1 is formed with a pocket 11 defined by the open top of the bolster at this point transverse wall members 12 and 13, and inclined downwardly converging wall members 14 which merge into a bottom wall 15 which constitutes a seat and which preferably extends below the lower surface of the bolster to give considerable height to the pocket so that long rockers and adequate bearings therefor may be easily accommodated. The inclined walls 14 are located inwardly of but merge into the sides of the bolster as clearly indicated in Figure 3. An inclined wall structure such as this will naturally have greater strength than a parallel wall arrangement. The inclined wall members 14 may be provided with openings 16 and the walls 12 and 13 are likewise preferably provided with openings 17 and 18, the latter of which has a function to be hereinafter explained. The top of the bolster is of course formed with an opening at the top of the pocket. The bottom wall 15 is likewise provided with openings 19 for the purpose of permitting the escape of any water or other foreign matter accumulating within the pocket and which, unless removed, would have a deleterious effect upon the coacting bearing surfaces to be described.

Located within each pocket is a load sustaining side bearing assembly preferably including a supporting member 20 of substantially block-like form and of a size to fit comparatively snugly within the space, this block being preferably held against displacement, during handling or shipment, by a rivet 20ᵃ or the like passing through the block and the bottom of the pocket and having its head located within a recess 20ᵇ in the block. This block rests upon the wall 15 and its underside is centrally recessed at 21. The center of the top of the wall 15 is also preferably recessed at 15ᵃ so that only the marginal portions of the block will bear upon the bottom of the pocket. This block sustains the load through the medium of the side bearing structure and by recessing its underside and the top of the bottom wall of the pocket the strain is brought toward the sides of the pocket instead of being concentrated at the center. The end portions of the block are preferably recessed or notched at 22, these notches leading to the holes 19 so as not to obstruct the escape of water or the like.

Engaged in turn upon this supporting block member is a bearing member 23 which may also be of block-like form with a flat top and a curved bottom surface 23ᵃ. To prevent dislocation of this member 23 with respect to the block, the former is preferably provided with a central depending tooth or lug 24 received within the recess 20$^b$ or other recess in the top of the block 20. Clearly, any desired number of such teeth or lugs may be provided, there being no limitation as to the provision of a single one.

Disposed within each pocket 11 is a rocker 26 which preferably extends above the top of the bolster and which has a cylindrical lower surface 27 seating upon or rockably engaged upon the bearing member 23 and restrained from any movement other than rocking as by means of depending teeth 28 engaging within recesses 29 in the member 23. The curvature of the lower surface in the rocker is such that its directrix or the axis extends longitudinally of the bolster. Clearly, the rockers move transversely of the truck bolster when relative swivelling movement of the truck and body bolsters occurs. The rocker may have its bottom portion elongated longitudinally of the bolster and its upper portion elongated or of greater width transversely of the bolster and the upper surface 30 is partially or substantially spherical for coaction with bearing means depending from the body bolster. A substantially central flat area 30$^a$ of suitable extent serves to give initial stability to the supported car and further serves as a means to square the truck bolster after the car has left a curve or is running on straight track. While of course the rocker may be of solid construction it is here represented as cored out or formed with webs 31 which provide the necessary stiffness while the weight is thereby reduced.

The bearing structure depending from each end portion of the body bolster for coaction with the above described rockers is indicated generally by the numeral 32 and comprises a substantially rectangular depending member 33 having outstanding flanges 34 riveted or otherwise suitably secured at 35 to the body bolster, it being a feature that shims 36 may be inserted between this member and the body bolster for the purpose of adjusting the height of the body bolster with respect to the truck bolster to provide the necessary clearance between the center plate and top surface of the truck bolster. The provision of shims of course enables any wear to be taken up. If necessary, the member 34 may have reinforcing webs 37 thereon located at any desired points. The bottom surface of the member 33 is flat and rests upon the spherical surface 30 of the rocker.

It is of course necessary to provide some means cooperating between the rockers and the depending elements carried by the bolster for preventing undesired relative movement and for returning the parts to normal or neutral position subsequent to swivelling movement or lateral motion. To accomplish this, I preferably provide each rocker with an upstanding spud 38 so constructed or arranged as to have its axis inclined toward the center of the bolster, the spud being located at the center of the nearly spherical top surface 30 and being received within a recess or socket 39 in the member 33. This recess or socket has its lower end preferably tapered at 40 so as to receive the base portion of the spud comparatively closely, the upper portion of the socket being necessarily enlarged and the spud being tapered and beveled off at one side as indicated at 41 so as to avoid interference or binding when the rockers move during relative swivelling or lateral motion of the bolsters. Inasmuch as the spuds on the rockers are engaged within the sockets in the bearing elements carried by the body bolster it is quite apparent that there can be no dislocation of the parts and that they will always return to normal or neutral position after the completion of any relative movement of the bolsters.

As stated above, the axis of the curved bottom surface 27 of each rocker is longitudinal of the bolster, while the axis of the curved bottom surface 23$^a$ of the bearing member 23 is transverse with respect to the bolster. It is intended that the various curved surfaces be so related that when the side bearing structures rock longitudinally of the truck bolster upon their curved surfaces 23$^a$ there will be a lifting effect exerted on the body bolster. This may be accomplished by having the radii of the surfaces 23$^a$ and 30 eccentric, the centers or axes being located respectively above and below the rocker, and is of course desirable for the reason that when lateral motion occurs there is a lifting effect exerted on the body bolster producing a potential energy tending to restore the parts to normal position upon the cessation of the force tending to impart the lateral motion to the body bolster. The relative swivelling movement of the bolsters of course causes the rockers 26 to rock transversely upon their lower surfaces 27, and it is intended that the centers of curvature of the surfaces 30 and 27 coincide to avoid a lifting effect during swivelling. There is obviously a compound movement of the rockers when swivelling and lateral motion occur at the same time and there is of course a torsional effect on the rockers which is well taken care of by the engagement of the partially spherical top surfaces 30 with the flat undersides of the depending elements 33. Theoretically, there is a point bearing but of course in practice there is a sufficiently appreciable surface in actual contact to prevent excessive concentration or localization of strain.

While the centers of curvature of the surfaces 27 and 30, considered transversely of the bolster, coincide, the radius of the former is less than that of the latter. These radii are indicated by the dot and dash lines R and R$^1$. The ratio of one to the other may of course be varied but it is important that the radius R be materially less than the radius R$^1$ so as to shorten the distance through which the line of contact of the surface 27 with the member 23 moves at opposite sides of the longitudinal center line of the bolster. Clearly, by maintaining the line of contact as close to the center of the bolster as possible torsional stresses and strains upon the bolster will be reduced to the minimum.

Owing to the necessity for the provision of the spud 38 at the top of each rocker, it becomes equally essential that the rockers be installed in the proper position. The rockers at both ends are of course the same but they must be placed in the pockets in such position that the spuds may operate within the sockets when the different relative movements of the parts occur. For this reason I have shown the rocker as provided with a projection or lug 42 accommodated within the opening 17 in the wall member 12. It will be noted that the opening 18 in the wall 13 has its lower edge in a higher plane than the lower edge of the opening 17 so that if an attempt were made to install a rocker in reversed position the lug 42 would strike against the lower edge of the opening 18 and prevent the rocker from being seated on the member 23. Of course, it is impossible to install the rocker in a position transverse to that it should occupy as the teeth 28 would not enter the holes 29 provided for their reception. Incorrect assembly is consequently impossible.

While it is not an essential feature in the present invention, I prefer to provide auxiliary spring mechanism operating in series with the truck springs 4. In carrying this out, I provide a carrier 43 located within each end extension 2 of the bolster and so constructed as to provide compartments within which are mounted groups or banks of elongated plate or leaf springs 44 which extend transversely with respect to the bolster and which have their ends engaging beneath ledges 45 so that they will be capable of flexing or blowing upwardly. The bottom of each extension 2 is formed with openings 46 for the passage of lugs 47 which are slidable therethrough and which are carried by a combined seat and follower 48 which rests upon the springs 4. The carrier 43 is likewise preferably provided with sockets or holes 49 receiving guide extensions 50 on the lugs 47. It is preferable that the spring plates or leaves in each group be apertured at 51 for the passage of rivets 52, or the like, so that the springs will be maintained in the proper assembled relation. Of course, the carrier 43 is detachable or removable from the bolster, the extreme end of the latter being open for that purpose but normally closed by a slidably mounted closure plate 53. Clearly, the auxiliary springs 44 are in series with the truck springs 4 and will operate to increase the spring travel, compensating for lack of usual side bearing clearance so that the wheels will have a reserve force causing them to remain in contact with any low spots encountered in track. The added capacity of these auxiliary springs gives a greater shock absorbing capacity to the spring group as a whole. Furthermore, the period of oscillation of these leaf springs 44 is different from that of the truck springs 4 and synchronization is thus broken up or prevented and any development of car roll or side sway avoided.

In the modified form of the invention illustrated in Figures 8 to 12 inclusive, the structure is in many respects substantially the same as that above described. However, there are some points of difference to be described in detail.

In these figures, the bolster 54 is formed centrally with an upstanding guide flange 55 for the reception of the center plate 56 carried by the body bolster, and the space within the confines of this flange is elongated to permit lateral motion of the body bolster with respect to the truck side frames. There is no slidable guide member as in the first described form. The flange 55 is represented as reinforced by inclined webs 57. Near each end, the bolster is provided with a pocket 58 corresponding to the pocket 11 and formed in a somewhat similar manner except that its bottom 59 is in a higher plane than the bottom of the first described form and is reinforced or strengthened by intersecting webs 60 which merge into the adjacent wall portions of the bolster. In this instance the above described bearing block member 20 is omitted, a bearing member 61 corresponding to the bearing member 23 having its curved bottom surface resting directly upon the bottom of the pocket. Identically the same type of rocker 62 is provided as in the first described form, this rocker having curved surfaces as above described and being provided with a spud 63 corresponding to the spud 38.

This form of the invention differs from the other in another respect, namely: in the construction of the depending elements which are carried by the body bolster and which cooperate with the rockers. In detail, the numeral 64 designates a member secured to the body bolster and formed with a pocket 65 within which is located a bearing member 66 detachably held in place as by cotter pins or the like 67 which pass through the member 64 in transverse relation to the pocket 65 and which are accommodated within notches or recesses 68 in the opposite ends of the bearing member 66. In this instance the shims 67 are located within the pocket 65 and are provided for adjusting purposes described in connection with the first form. The bearing member 66 is formed with a socket 69 accommodating the spud 63, the characteristics of the spud and socket and their purpose being the same as above described.

This form of the invention operates in the same manner as that above described, the rockers having the same movement. Likewise, substantially the same benefits are derived from the use of this structure and a detailed description of the action is clearly unnecessary as being a repetition.

As a further modification, I may provide a structure illustrated in Figure 12 which discloses different means for maintaining the rockers in proper relation to the bearing member upon which they seat. In both of the above described forms teeth and holes are provided. In this figure there is provided a rockable bearing member 70 corresponding to the members 23 and 61 and held in place with respect to the bottom of the pocket by the same means. However, in this instance the member 70 is provided with tapered or frusto-conical holes 71 which register with holes 72 in the bottom of the bolster and with other holes 73 in the bottom portion of the rocker 74, all of said holes being provided for the passage of bolts 75 carrying nuts 76 located beneath the bottom of the pocket. Coil springs 77 encircle these bolts and abut against the heads thereof and against the lower portion of the rocker. Obviously, these bolts will prevent relative undesired displacement of the parts and the springs will act to restore the parts, that is to say the rockers, to normal or neutral position upon the cessation of a moving force tending to rock the rockers longitudinally of the bolster.

From the foregoing description and a study of the drawings it will be apparent that I have thus provided a novel truck bolster and bearing structure of such arrangement that no weight whatsoever comes upon the center of the truck bolster, means being provided at this point only for the purpose of guiding the center plate carried by the body bolster during lateral motion of the body bolster with respect to the truck. All the weight is sustained by the side bearing assemblies which comprise the several parts or a unitary structure equivalent to the plurality of parts, the entire assembly being of such a nature that universal movement of the upper ends of the rockers themselves will be permitted so that they may accommodate themselves to swivelling movements and lateral movement of the body bolster. Adequate means has been provided for preventing any displacement whatsoever of the various elements of the side bearing assemblies with respect to one another. The provision of the flat spots on the substantially spherical top surfaces of the rockers is of prime importance for the reason that stability is thus given to the car body and undesired oscillations of the rockers during ordinary train movement prevented. A positive force is required to upset the equilibrium of the rockers during either swivelling or lateral motion and owing to the fact that a lifting action on the body bolster is accomplished when lateral motion occurs gravity will operate to restore the parts to normal when the lateral motion producing tendency ceases, as when the car returns to straight track after passing over or about a curve. The detailed features of superiority over ordinary structures have been stressed hereinbefore and a recapitulation would therefore be surplusage. It might also be mentioned, however, that a bolster constructed in accordance with the invention may be used to replace one of the ordinary or popularly accepted standards without involving the making of any changes or modifications in the side frames or other parts of a truck. Obviously this is important as the cost of installing the new equipment will be reduced to the minimum.

While I have shown and described the preferred embodiment of the invention and certain slight modifications thereof, it should be understood that the disclosure is really simply an exemplification of the fundamental principles and theories involved and that the right is reserved to make all such changes and improvements as will not depart from the spirit of the invention or the scope of the claims hereunto appended.

Having thus described the invention, I claim:

1. In combination, a body bolster having load sustaining depending side bearing elements and a center guide, a truck bolster having a guide pivotally receiving the center guide of the body bolster without weight and permitting movement of the body bolster laterally with respect to the truck, and load sustaining side bearing assemblies carried by the end portions of the truck bolster and engaging said depending side bearing elements of the body bolster, the side bearing assemblies including superposed elements certain of which are rockable only laterally of the truck bolster and others of which are rockable only longitudinally of the truck bolster whereby the upper ends of the assemblies may have universal movement.

2. In combination, a body bolster carrying depending side bearing elements, a truck bolster, means on the truck bolster and body bolster at the centers thereof permitting swivelling movement and acting to guide the body bolster while permitting lateral movement thereof with respect to the truck, and load sustaining side bearing assemblies carried by the truck bolster and engaging said depending side bearing elements, each of said side bearing assemblies embodying a plurality of superposed relatively rockable elements the movements of which are limited to directions at right angles to each other.

3. In combination, a body bolster carrying depending side bearing elements, a truck bolster, means on the truck bolster and body bolster at the centers thereof permitting swivelling movement and acting to guide the body bolster while permitting lateral movement thereof with respect to the truck, and load sustaining side bearing assemblies carried by the truck bolster and engaging said depending side bearing elements, each of said side bearing assemblies embodying a plurality of movable parts having relative movement whereby the faces engaging said depending side bearing elements may have universal movement, said faces being substantially spherical with flattened intermediate portions coacting with the depending side bearing elements to give initial stability to the body bolster and load thereon.

4. In combination, a body bolster having load sustaining side bearing elements, a truck bolster, coacting guide means on said bolsters at the centers thereof permitting relative swivelling movement and lateral motion of the body bolster with respect to the truck, and side bearing assemblies mounted on the truck bolster and engaging said load sustaining elements, each side bearing assembly including superposed members having curved surfaces and separately capable of rocking movement in different planes whereby the upper end of the uppermost member may have universal movement.

5. In combination, a body bolster having load sustaining side bearing elements, a truck bolster, coacting guide means on said bolsters at the centers thereof permitting relative swivelling movement and lateral motion of the body bolster with respect to the truck, and side bearing assemblies mounted on the truck bolster and engaging said load sustaining elements, each side bearing assembly including superposed members having curved surfaces and separately capable of rocking movement in different planes whereby the upper end of the uppermost member may have universal movement, the coacting surfaces of the topmost member of each side bearing assembly and the depending side bearing elements being formed to provide stability and to require a positive force to effect movement of any portion of the side bearing assemblies.

6. In combination, a body bolster having a center plate and load sustaining side bearing elements depending therefrom, a truck bolster having guide means pivotally receiving the center plate and provided near each end with a pocket, a load sustaining side bearing assembly mounted within each pocket and engaging the side bearing element depending from the body bolster, said side bearing assembly embodying parts movable in different directions and relatively to one another whereby the upper end of the assembly will be capable of universal movement, and means within the pocket for preventing bodily shifting of the side bearing assembly in any direction.

7. In combination, a body bolster having a center plate and load sustaining side bearing elements depending therefrom, a truck bolster having guide means pivotally receiving the center plate and provided near each end with a pocket, a load sustaining side bearing assembly mounted within each pocket and engaging the side bearing element depending from the body bolster, said side bearing assembly embodying independently relatively movable parts operating in different directions whereby the upper end of the assembly will be capable of universal movement, and means for limiting relative movement of the side bearing assembly parts to rocking only.

8. In combination with a body bolster having pivot means and load sustaining side bearing elements, a truck bolster having a guide receiving said pivot means and formed near each end with a pocket, a load sustaining side bearing assembly within each pocket comprising a bearing member mounted for rocking movement longitudinally of the bolster, a rocker mounted on said bearing member for movement transversely of the bolster, and means on said rocker cooperatively engaging the corresponding side bearing element carried by the body bolster for preventing dissassociation of the parts.

9. In combination with a body bolster having load sustaining side bearing elements thereon, a truck bolster, formed near each end with a pocket, means pivotally and slidably connecting the bolsters, and a load sustaining side bearing assembly within each pocket comprising a bearing member mounted for rocking movement longitudinally of the bolster, a rocker mounted on said bearing member for movement transversely of the bolster, and means on said rocker cooperatively engaging the corresponding side bearing element carried by the body bolster for preventing disassociation of the parts, comprising a spud of tapered form on the rocker, and a socket formed in the side bearing element and receiving said spud.

10. In combination with a body bolster having load sustaining side bearing elements thereon, a truck bolster formed near each end with a pocket, means pivotally and slidably connecting the bolsters, and a load sustaining side bearing assembly within each pocket comprising a bearing member mounted for rocking movement longitudinally of the bolster, a rocker mounted on said bearing member for movement transversely of the bolster, and means on said rocker cooperatively engaging the corresponding side bearing element carried by the body bolster for preventing disassociation of the parts, comprising a spud of tapered form on the rocker, and a socket formed in the side bearing element and receiving said spud, the axis of the spud being inclined with respect to that of the rocker.

11. In combination with a body bolster having load sustaining side bearing elements thereon, a truck bolster formed near each end with a pocket, a pivotal and slidable connection for the bolsters, and a load sustaining side bearing assembly within each pocket comprising a bearing member mounted for rocking movement longitudinally of the bolster, a rocker mounted on said bearing member for movement transversely of the bolster, means on said rocker cooperatively engaging the corresponding side bearing element carried by the body bolster for preventing disassociation of the parts, comprising a spud of tapered form on the rocker, and a socket formed in the side bearing element and receiving said spud, the spud and the socket therefor being shaped to permit torsional movement of the rocker with respect to the side bearing element without binding.

12. In combination, a truck bolster having a guide thereon, a body bolster having pivot means mounted within said guide for movement longitudinally of the truck bolster, depending load sustaining bearing elements carried by the body bolster, the truck bolster being formed near each end with a pocket, and a bearing assembly within each pocket including a bearing member mounted for rocking movement longitudinally of the truck bolster, a rocker supported upon said bearing member for movement transversely of the truck bolster, said rocker having a substantially cylindrical lower surface and a substantially spherical upper surface, said upper surface contacting with the bottom of the corresponding side bearing element depending from the body bolster, and operative connections between said bearing member and rocker and between the rocker and the depending side bearing element.

13. In combination, a truck bolster having a guide thereon, a body bolster having pivot means movably mounted within said guide longitudinally of the truck bolster, depending load sustaining bearing elements carried by the body bolster, the truck bolster being formed near each end with a pocket, and a load sustaining bearing assembly comprising a bearing member mounted within each pocket for rocking movement longitudinally of the truck bolster, a rocker supported upon said bearing member for movement transversely of the truck bolster, said rocker having a substantially cylindrical lower surface and a substantially spherical upper surface, said upper surface contacting with the bottom of the corresponding side bearing element depending from the body bolster, operative connections between said bearing member and rocker and between the rocker and the depending side bearing element, said bearing member within the pocket having a tooth thereon, and means receiving said tooth for preventing slidable shifting of said bearing member.

14. A truck bolster provided near each end with a pocket defined by spaced walls extending transversely of the bolster and downwardly converging inclined side walls merging into the sides and bottom of the bolster, a bearing member seated in the bottom of the pocket, load carrying means engaged upon said bearing member for universal movement, said load carrying means embodying a rocker, and means on the rocker cooperating with the first named walls to prevent incorrect assembly.

15. A truck bolster provided near each end with a pocket defined by spaced walls extending transversely of the bolster and downwardly converging inclined side walls merging into the sides and bottom of the bolster, a bearing member seated in the bottom of the pocket, a rocker engaged upon said bearing member and cooperating therewith whereby its upper end may have universal movement, said spaced transverse walls having openings therein of different lengths, and a lug projecting laterally from the rocker and adapted to be accommodated within the longer of said openings, said lug being adapted to strike against the end of the other opening upon an attempt to install the rocker in reversed relation.

16. In combination, a body bolster having depending load sustaining side bearing elements thereon, a truck bolster formed near each end with a pocket, and a load sustaining side bearing structure located within each pocket for cooperation with said depending bearing elements, each side bearing structure embodying a plurality of superposed elements having certain surfaces flat and other surfaces curved, certain of the curved surfaces having their axes at right angles to the truck bolster and others having their axes extending longitudinally with respect to the truck bolster whereby the top of the side bearing assembly will be capable of universal movement.

17. In combination, a body bolster having depending bearing elements thereon each formed with a socket larger at its upper portion than at its lower, a truck bolster formed near each end with a pocket, a bearing member mounted within each pocket for rocking movement longitudinally of the truck bolster, a rocker mounted upon said bearing member for rocking movement transversely with respect to the truck bolster and having a substantially spherical top surface, a spud at the center of the spherical surface tapered in shape with one edge beveled off, the spud being received within said socket and the shape thereof permitting universal movement of the rocker with respect to the depending bearing element.

18. In combination, a body bolster having depending bearing elements near its ends, a truck bolster having a pocket near each end, a supporting member mounted within each pocket and having its undersurface centrally recessed to bear upon the bottom of the pocket at only its marginal portions, and a side bearing assembly mounted on said supporting member and cooperating with the corresponding one of said depending bearing elements.

19. In combination, a body bolster having depending bearing elements near its ends, a truck bolster having a pocket near each end, a supporting member mounted within each pocket and having its undersurface centrally recessed to bear upon the bottom of the pocket at only its marginal portions, a side bearing assembly mounted on said supporting member and cooperating with the corresponding one of said depending bearing elements, and means for securing said supporting member against displacement.

20. In combination, a body bolster having depending bearing elements near its ends, a truck bolster having a pocket near each end, a supporting member mounted within each pocket and having its undersurface centrally recessed to bear upon the bottom of the pocket at only its marginal portions, a side bearing assembly mounted on said supporting member and cooperating with the corresponding one of said depending bearing elements, said assembly including a bearing member rockably mounted upon said supporting member longitudinally of the truck bolster, and a rocker mounted upon said bearing member and rockable transversely of the truck bolster.

21. In combination, a body bolster having depending bearing elements near its ends, a truck bolster having a pocket near each end, a supporting member mounted within each pocket and having its undersurface centrally recessed to bear upon the bottom of the pocket at only its marginal portions, a side bearing assembly mounted on said supporting member and cooperating with the corresponding one of said depending bearing elements, said assembly including a bearing member rockably mounted upon said supporting member longitudinally of the truck bolster, a rocker mounted upon said bearing member and rockable transversely of the truck bolster, the rocker having a substantially spherical top surface, and means on said surface cooperatively engaging the depending bearing element for permitting universal movement of the rocker with respect to the body bolster while preventing disassociation.

22. A rocker member for a railway truck side bearing having upper and lower bearing faces, one of said faces being substantially cylindrically curved and the other being substantially spherical and provided centrally with a flattened area adapted to coact with a bearing element, said flattened area giving initial stability.

23. In a lateral motion device, a truck bolster having a pocket within each end portion, guides at the bottom of each pocket, a bearing member located within the bottom of each pocket between the guides, means for retaining the bearing member in position, a rocker seated on each bearing member adapted for cooperation with side bearing elements depending from a body bolster, said pocket being laterally enlarged and of considerably greater dimensions longitudinally than the rocker to permit universal movement of the rocker, and means facilitating correct assembly of the rockers.

24. A truck bolster provided near each end with a pocket, a supporting member located within each pocket, and a side bearing assembly rockably mounted upon the supporting member, said supporting member being recessed at its underside and the top surface of the bottom of the pocket being recessed to provide marginal areas in contact whereby the load sustained by the side bearing assembly will be brought upon the outer portion of the pocket.

25. A truck bolster provided near each end with a pocket, a supporting member mounted within each pocket, a side bearing assembly rockably mounted upon each supporting member, the supporting member having a hole therethrough and a recess at the upper end of the hole cooperating with the side bearing assembly, a securing member passing through said hole and the bottom of the pocket for holding the supporting member against displacement, one end of the securing member being received within said recess.

26. A truck bolster provided near each end with a pocket, a supporting member mounted within each pocket, a side bearing assembly rockably mounted upon each supporting member, the supporting member having a hole therethrough and a recess at the upper end of the hole to receive a depending element on the side bearing assembly, a securing member passing through said hole and the bottom of the pocket for holding the supporting member against displacement, one end of the securing member being received within said recess, and a tooth on the lower end of the side bearing assembly received within said recess for holding the side bearing assembly against bodily displacement.

27. In combination, a body bolster having depending load sustaining side bearing elements thereon, a truck bolster, combined guide and pivot means connecting the bolsters for permitting relative swivelling movement thereof with respect to each other and lateral motion of the body bolster with respect to the truck, the truck bolster having pockets therein near its ends, and load sustaining side bearing assemblies located within the pockets and engaging said depending side bearing elements, each side bearing assembly including a rocker and a bearing member thereunderneath having a cylindrical lower surface with its axis above the top of the rocker, the rocker having a substantially spherical top surface with its directrix located below the bearing member, the rocker having a cylindrical lower surface with its axis coincident with the directrix of the curved top surface and located at right angles to the axis of the first mentioned cylindrical surface.

28. In combination, a body bolster having depending load sustaining side bearing elements thereon, a truck bolster, coacting means on said bolsters permitting relative swivelling movement thereof and lateral motion of the former, and load sustaining side bearing assemblies carried by the truck bolster and cooperating with said depending side bearing elements, each side bearing assembly including a rocker having a substantially spherical top surface and a cylindrical lower surface having its directrix extending longitudinally of the truck bolster, the centers of curvature of said surface coinciding and the radius of the latter being less than that of the former to reduce the distance beyond opposite sides of the center line of the truck bolster travelled by the line of contact between said second named curved surface and its support.

29. In combination, a body bolster having depending load sustaining side bearing elements thereon, a truck bolster, coacting means on said bolsters permitting relative swivelling movement thereof and lateral motion of the former, and load sustaining side bearing assemblies carried by the truck bolster and cooperating with said depending side bearing elements, each side bearing assembly including a rocker having a substantially spherical top surface and a cylindrical lower surface having its directrix extending longitudinally of the truck bolster, the centers of curvature of said surfaces coinciding and the radius of the latter being less than that of the former whereby upon the occurrence of swivelling movement of the bolsters a line generated by a point on the second named surface of the rocker during movement thereof will be of less length than a line generated by a point on the first named surface.

30. In a railway car truck, a truck bolster formed with a pocket, a side bearing assembly mounted within the pocket and including superposed elements mounted for rocking movement with respect to each other and in directions at right angles to each other, and yieldable means anchoring the side bearing assembly to the bottom of the pocket and tending to maintain the side bearing assembly in upright position.

31. In a railway car truck, a truck bolster formed with a pocket having a bottom wall, a side bearing assembly located within the pocket and including superposed rocker elements movable relatively in directions at right angles to each other, and yieldable means anchored to the bottom wall of the pocket and cooperating with said rocker elements for normally maintaining the same in a certain relative position.

32. In a railway car truck, a truck bolster formed with a pocket having a bottom wall, a side bearing assembly located within the pocket and including superposed rocker elements movable respectively in directions at right angles to each other, guide elements extending through the bottom wall of the pocket and through said rocker elements, and spring means cooperating with said guide elements and the uppermost rocker element for normally maintaining the side bearing assembly in upright position.

33. In a railway car truck, a truck bolster provided with pockets, a body bolster pivotally and slidably mounted on the truck bolster and equipped with depending bearing elements, and a side bearing assembly within each pocket, each assembly including a lower rocker movable longitudinally of the truck bolster, further including an upper rocker member movable transversely of the truck bolster and provided with means entering within the depending bearing element thereabove.

34. In a railway car truck, a truck bolster provided with pockets, a body bolster pivotally and slidably mounted on the truck bolster and equipped with depending bearing elements, and a side bearing assembly within each pocket, each assembly including a lower rocker element movable longitudinally of the truck bolster, further including an upper rocker member movable transversely of the truck bolster and having interfitting relation with the depending bearing element thereabove.

35. In a railway car truck, a truck bolster provided with pockets, a body bolster pivotally and slidably mounted on the truck bolster and equipped with depending bearing elements, and a side bearing assembly within each pocket, each assembly including a lower rocker movable longitudinally of the truck bolster, further including an upper rocker member movable transversely of the truck bolster, and means connecting the upper rocker member and the depending bearing adapted to be accommodated within the longer ment other than rocking and swivelling.

PERCY R. DRENNING.